United States Patent [19]

Clampitt et al.

[11] 3,955,998

[45] May 11, 1976

[54] AQUEOUS GELS FOR PLUGGING FRACTURES IN SUBTERRANEAN FORMATION AND PRODUCTION OF SAID AQUEOUS GELS

[75] Inventors: Richard L. Clampitt; James E. Hessert, both of Bartlesville, Okla.

[73] Assignee: Phillips Petroleum Company, Bartlesville, Okla.

[22] Filed: July 18, 1974

[21] Appl. No.: 489,749

Related U.S. Application Data

[60] Division of Ser. No. 372,242, June 21, 1973, Pat. No. 3,845,822, which is a continuation-in-part of Ser. No. 224,956, Feb. 9, 1972, abandoned.

[52] U.S. Cl............................ 106/193 R; 106/194; 106/197 C; 252/316
[51] Int. Cl.$^2$............................................ C08L 1/26
[58] Field of Search............... 252/316; 106/193 R, 106/194, 197 C

[56] References Cited
UNITED STATES PATENTS

| | | | |
|---|---|---|---|
| 2,520,805 | 8/1950 | Joy | 106/194 X |
| 2,733,156 | 1/1956 | Cornell et al. | 106/194 X |
| 3,265,657 | 8/1966 | Sinclair | 252/316 X |

*Primary Examiner*—Richard D. Lovering

[57] ABSTRACT

Aqueous gels suitable for plugging fractures in subterranean formations are produced by (1) thickening water by incorporating therein a thickening amount of a water-soluble cellulose ether (e.g.,CMC), (2) incorporating a water-soluble compound of a polyvalent metal (e.g., sodium or potassium dichromate) wherein the valence state of the metal therein is capable of being reduced to a lower polyvalent valence state, in an amount sufficient to cause gelation when the valence of at least a portion of said metal is reduced to said lower valence state, (3) incorporating a water-soluble reducing agent (e.g., a sulfite, hydrosulfite, metabisulfite or thiosulfate of sodium or potassium, sodium sulfide, hydrogen sulfide or mixtures thereof) in an amount effective to reduce at least a portion of said metal to said lower valence state and cause gelation, and (4) incorporating a finely divided solid (e.g., diatomaceous earth) in an amount sufficient to cause an increase in gel strength.

23 Claims, No Drawings

AQUEOUS GELS FOR PLUGGING FRACTURES IN SUBTERRANEAN FORMATION AND PRODUCTION OF SAID AQUEOUS GELS

This application is a division of our copending application Ser. No. 372,242, filed June 21, 1973, now U.S. Pat. No. 3,845,822, issued Nov. 5, 1974, which in turn was filed as a continuation-in-part of our then copending application, Ser. No. 224,956, filed Feb. 9, 1972, now abandoned.

This invention relates to the plugging or sealing of fractures in formations.

The secondary recovery of oil from oil-bearing or containing subterranean formations by fluid drive processes wherein a fluid is injected into the formation via one or more injection wells to drive the oil through the formation to one or more offset production wells is a well-known process. Fluids used in such processes include liquids, such as water and various hydrocarbons, and gases such as hydrocarbon gases, carbon dioxide, etc. Problems are encountered in such processes due to the predilection of the drive fluid to preferentially seek the higher permeability zones and to more or less bypass the lower permeability zones. Various processes have been developed for treating said high permeability zones to divert at least a portion of the drive fluid therefrom to the lower permeability zones.

Another problem frequently encountered in such fluid drive processes is the more or less direct channeling of relatively large quantities of the drive fluid from the injection well to the producing well(s), caused by the existence of natural or manmade fraction in the formation. This problem is recognized as different and/or distinct from the problem discussed in the preceding paragraph, and requires different techniques for the elimination of the problem.

The problem of channeling of fluids through fractures in formations is not confined to secondary recovery operations. In some instances, fractures communicating with an aquifer adjacent a hydrocarbon-bearing formation, and also communicating with said hydrocarbon-bearing formation, will cause water or brine to be produced in excessive amounts along with the hydrocarbon. Various modifications of the problem are sometimes referred to as coning.

The present invention provides a solution for the problems discussed in the two preceding paragraphs, and other problems related thereto. The present invention provides a method of plugging fractures in formations by placing in said fractures aqueous gels, prepared by gelling solutions of cellulose ethers, to plug said fractures, as described further hereinafter.

Thus, according to the invention, there is provided a method for plugging a fracture in a formation, which method comprises: introducing into said fracture a fluid comprising an aqueous gel, said gel comprising water to which there has been added a water-thickening amount of a water-soluble cellulose ether, a sensible amount of a water-soluble compound of a polyvalent metal wherein the metal present is capable of being reduced to a lower polyvalent valence state and which is sufficient to gel said water when the valence of at least a portion of said metal is reduced to said lower valence state, and an amount of a water-soluble reducing agent which is effective to reduce at least a portion of said metal to said lower valence state; and maintaining said gel in said fracture in a quiescent state for a period of time sufficient for said gel to develop sufficient gel strength to remain in place in said fracture.

In the practice of the invention, the aqueous gels can be injected into the formation employing conventional pumping equipment. If desired, said gels can be injected into a selected portion or portions of the formation. When the formation is a subterranean formation penetrated by a wellbore, said selected portion(s) can be isolated by employing one or more well packers at the proper locations using packers and methods known in the art.

When the aqueous gels used in the practice of the invention are injected down a well into a subterranean formation, it is desirable to follow the slug of gel with a slug of flush liquid such as water or oil, e.g., crude oil, to flush the well casing. Said slug of water or oil should be at least sufficient to clear the perforations. Otherwise, the casing and the perforations would be blocked when the gel sets to a firm gel. Water would be used in the flushing operation if the injection well is an injection well in a secondary recovery process. Oil would be used as the flushing liquid if the well were a producing well.

After the gel has been placed in the formation, and the casing and perforations cleared, it is preferred to shut in the well and maintain the gel in a quiescent state for a period of time sufficient to permit the gel to develop sufficient gel strength to remain in place. Thus, for example, the well would preferably be shut in for a period of about 8 to 48 hours before resuming injection of the regular drive fluid, or resuming production of hydrocarbons if the well is a producing well. Shut-in periods outside said range can be employed if desired, depending upon the particular gel used, the nature of the formation, and the extent of the fracturing system in said formation.

In some instances, depending upon the type of formation and the fracture system therein, a deeply-placed plug, e.g., a plug of gel placed out in the formation from the injection well a distance of 25 to 100 feet, more or less, can be employed. Thus, in one embodiment of the invention, the afterflush of water or other liquid would be sufficient to not only clear the perforations, but would also be sufficient to displace the slug of gel out into the formation a predetermined desired distance. This embodiment is particularly useful where there is a more or less well-defined fracture system occupying a relatively small portion of the formation.

The amount of the aqueous gel used in the practice of the invention will depend upon the type of formation being treated, the extent or volume of the fracture system therein, and the portion or amount of said fracture system which it is desired to block. Generally speaking, the use of any suitable amount is within the scope of the invention. Thus, the invention is not limited to the use of any particular amount of said aqueous gels as the plugging medium. The extent or volume of a fracture system in a particular formation can be determined by methods known in the art. For example, a known sized slug of water containing a fluorescent dye can be injected, followed by continued injection of water until the dye appears at the offended producing well. The amount of following water so injected will provide an estimate of the volume of the fracture system connecting the injection well with the producing well. Radioactive tracers can be similarly employed.

The aqueous gels used in the practice of the invention can be injected at any suitable rate and any suitable pressure. Usually, the injection rate will be within the range of from 0.1 to 50 barrels per minute, preferably 1 to 10 barrels per minute. If desired, the injection pressure can be sufficient to overcome the weight of the overburden and open the fracture, maintain the fracture open, and thus facilitate placement of the gel plug. The use of such increased injection pressures would depend upon the nature of the formation being treated and the fracture system therein. If such increased pressures are used, the release of the pressure will allow the fracture to close and subject the gel to the overburden pressure, aiding in holding the gel in place.

Another embodiment of the invention comprises a combination acidizing-plugging treatment. This embodiment of the invention is particularly useful where the formation is susceptible to attack by an acid. In this combination method, the injection of the slug of plugging gel is preceded by a slug of acid sufficient to penetrate into the fracture system any desired distance, depending upon the type of formation and volume of the fracture system therein. The acid will react with, etch, and roughen the fracture faces. This will provide a clean, rough surface for the gel to adhere to. The slug of acid can be permitted to remain in the fracture system and leak off naturally. Or, if desired, the injected acid slug can be followed immediately with a water flush to displace the acid. If the acid is permitted leak off naturally, it is then desirable to inject sufficient water to flush the spent or partially spent acid from the fracture system prior to injecting the gelled solution of cellulose ether.

Acids useful in the combination acidizing-plugging embodiment of the invention include any acid which is effective in increasing the flow of hydrocarbons through the formation and into the well. Examples of acids which can be used include inorganic acids such as hydrochloric acid, nitric acid, and sulfuric acid; organic acids such as acetic acid, and formic acid; and combinations of inorganic and organic acids. The concentration or strength of the acid can vary depending upon the type of acid, the type of formation being treated, and the results desired in the particular treating operation. For example, when hydrochloric acid solution is being used in a predominantly limestone formation, the concentration can vary from about 5 to about 38 weight percent Hcl, with concentrations within the range of 10 to 30 weight percent usually preferred. Organic acids are usually used in lower concentrations, e.g., about 10 weight percent. One preferred mixture of inorganic acids and organic acids comprises mixtures of hydrochloric acid and acetic acid. For example, 15 percent hydrochloric acid solution containing sufficient acetic acid to bring the total acidity to about 20 to 22 percent, based on equivalent HCl. The acids used in the practice of the invention can contain any of the known corrosion inhibitors, deemulsifying agents, sequestering agents, surfactants, friction reducers, etc., known in the art. The amount of acid used in any particular instance will depend upon a number of factors including the size or amount of formation to be treated, the type of formation being treated, the type of acid, the concentration of the acid, and the formation temperature. Thus, the invention is not limited to using any particular amount of acid in the combination fracturing-acidizing embodiment of the invention. Any suitable amount of acid, depending upon the nature of the formation being treated and the volume of the fracture system therein, can be employed.

When the combination acidizing-plugging treatment is not employed as described above, it will sometimes be desirable to precede the injection of the gel with a small slug of clean-up acid for the purpose of removing scale, wax deposits, etc., and clean the perforations. This clean-up acid can be any of the above-described acids. The clean-up acid would be followed with a water flush.

The aqueous gels used in the practice of the invention are particularly well suited in plugging fractures in formations. Said gels have the unusual property or ability to "wet" and adhere to oil-covered sand or other formation materials. They are much superior to other gels, e.g., gelled solutions of polyacrylamides, in this property. Gels formed by gelling aqueous solutions of cellulose ethers, e.g., CMC, will adhere to the fracture faces and remain in place. Said other gels will be slowly displaced through the fracture with a film of formation brine or oil on the fracture faces serving as a lubricant. More rigid gels can be prepared from cellulose ethers, e.g., CMC, than can be prepared from other materials, e.g., the linear polyacrylamides. This is another very desirable property for fracture plugging materials.

If desired, filler materials such as silica flour, diatomaceous earth, ground nutshells, finely divided natural sands, clay or clay-like materials such as Illite clay and kaolin, and finely divided plastic particles such as Microethene, etc., can be incorporated in the aqueous gels used in the practice of the invention.

In general, any of the water-soluble cellulose ethers can be used in preparing the aqueous gels used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC for carboxymethyl hydroxyethyl cellulose, etc. For example, water-soluble CMC is available in various degrees of carboxylate substitution ranging from about 0.3 up to the maximum degree of substitution of 3.0 In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above-preferred ranges usually has a lower viscosity and more is required in preparing suitable gels. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the gels used in the practice of the invention can vary widely depending upon the viscosity grade and purity of the ether, and properties desired in the aqueous gels of the invention. In general, the amount of cellulose ether used will be at least a water-thickening amount, i.e., at least in amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.2 to 1.5, preferably from 0.3 to 1.0, weight percent, based on the weight of water, can be used as thickening amounts. Amounts within said ranges provide gels which are better suited for the plugging operations described herein than are the more dilute or more concentrated gels which can be prepared. Amounts of cellulose ether within the above ranges provide gels which develop good gel strength when allowed to come to rest in a fracture. Said gels will also have sufficient early viscosity to obtain good displacement of water or other fluid from the fracture during placement of the gel, but will not be so viscous as to cause undue difficulties in the pumping thereof. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, said stiff gels can be "thinned" by dilution to any desired concentration of cellulose ether. This can be done by mechanical means, e.g., stirring, pumping, or by means of a suitable turbulence inducing device to cause shearing, such as a jet nozzle. Thus, there is really no fixed upper limit on the amount of cellulose ether which can be used. However, when a liquid mobile gel is desired, e.g. for placement in a fracture, it is desirable to dilute the more concentrated gels before they become rigid.

Metal compounds which can be used in preparing the aqueous gels used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the cellulose ether used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, we have discovered that when brines, such as are commonly available in producing oil fields, are used as the water in preparing gels in accordance with the invention, less of the starting polyvalent metal-containing compound is required than when distilled water is used. Stable gels have been prepared using brines having a wide range of dissolved solids content, e.g., from 850, 1,200, 6,000, and 90,000 ppm dissolved solids. Gelation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled as described herein.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, hydrogen sulfide, sodium thiosulfate, thioacetamide, and others; and nonsulfur-containing compounds such as hydroquinone, p-hydrazinobenzoic acid, hydrazine phosphite, hydrazine dichloride, and others. Some of the above reducing agents act more quickly than others, for example, sodium thiosulfate usually reacts slowly in the absence of heat, e.g., requiring heating to about 125°–130° F. The presently most preferred reducing agents are sodium hydrosulfite, potassium hydrosulfite, sodium thiosulfate, and potassium thiosulfate. Said thiosulfates are particularly useful in preparing aqueous gels having a retarded gelling rate. For example, it has been found that in comparable solutions of CMC-9 and using comparable amounts of $Na_2Cr_2O_7.2H_2O$, the addition of sodium hydrosulfite will initiate gelation within about 60 seconds; whereas the addition of sodium thiosulfate does not initiate gelation for about 6 minutes at essentially the same temperature conditions, 130° F.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution of the cellulose ether in water or other aqueous medium, or said metal-containing compound and said reducing agent can be added simultaneously to the solution or aqueous medium containing the cellulose ether. Generally speaking, where convenient, the preferred method is to first disperse the cellulose ether in the water or other aqueous medium. The metal-containing compound is then added to the solution or aqueous medium containing the cellulose ether, with stirring. The reducing agent is then added to the dispersion of cellulose ether, with stirring. Gelation starts as soon as reduction of some of the higher valence metal in the starting polyvalent metal-containing compound to a lower valence state occurs. The newly formed lower valence metal ions, for example +3 chromium obtained from +6 chromium, effect rapid crosslinking of the cellulose ethers and gelation of the solution or aqueous medium containing same.

One presently preferred method of preparing said aqueous gels is to prepare the gel while the components thereof are being pumped into the well. Said method comprises preparing a base solution of the cellulose ether, adding to this base solution (a) a polyvalent metal compound such as sodium dischromate or (b) a reducing agent such as sodium thiosulfate or sodium hydrosulfite, pumping said base solution down the well and into the fracture, and during said pumping adding to said base solution the other of said reagents (a) and (b) which was not previously added thereto. It is also within the scope of the invention to incorporate all the components of the aqueous gel into a stream of water while it is being pumped, e.g., into a well. For example, CMC could be added first to the flowing stream of water and the other components added subsequently in any suitable order. Turbulent flow conditions in the pipe will provide proper mixing.

It is also within the scope of the invention to prepare a dry mixture of the cellulose ether, the metal-containing compound and the reducing agent, in proper proportions, and then add this dry mixture to the proper amount of water.

An advantage of the invention is that ordinary ambient temperatures and other conditions can be used in practically all instances in preparing the aqueous gels or aqueous mediums containing same. However, in some instances, a small amount of heat may be desirable to aid in the formation of the gel, e.g., heating to a temperature of about 125°–130° F.

Aqueous gels can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of starting polyvalent metal compound used, and the type and amount of reducing agent used.

One procedure which can be employed to prepare said gels is to prepare a relatively concentrated or high viscosity gel and dilute same to a viscosity or concentration suited for the actual use of the gel. In many instances, this procedure results in a more stable gel. When employing said dilution technique a starting solution of cellulose ether containing, for example, 10,000 ppm by weight (1 wt. percent) of cellulose ether can be used. This solution is then gelled by the addition of suitable amounts of polyvalent metal compound and reducing agent. After gelation has proceeded to the desired extent, the resulting gel can be diluted to the concentration or viscosity most suited for its intended use. The more concentrated cellulose ether solutions usually have a faster rate of gelation. Thus, in most instances, it will be preferred to carry out the dilution soon after the components of the gel have been added to the water or other aqueous medium, e.g., within about 5 to 30 minutes. Preferably, the concentration of the cellulose ether in the "concentrated gel" will be at least twice that in the final gel. Dilution of the gel retards the rate of gelation. Thus, this dilution technique can be employed to control the gelation rate, if desired. In many instances, gels prepared by employing said dilution technique are more stable. Another advantage of said dilution technique is that it is usually more convenient to weigh out and handle the larger quantities of reagents.

We are aware that chromium ions having a valence of +3 have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of +3, e.g., $CrCl_3$, $Cr(NO_3)_3$, etc. We have found that thus-obtained $Cr^{+3}$ ions do not produce stable gels with cellulose ethers. The gels so produced either undergo syneresis or precipitation within a few minutes. In the practice of the present invention, the $Cr^{+3}$ ions must be newly formed, e.g., nascent ions formed in situ in the solution to be gelled.

Gel instability is evidenced by precipitation and/or syneresis (bleeding or water separation). A severe test of gel stability is to prepare the gel and merely allow it to stand. We have found that gels which are stable for as long as 48 hours are usually stable for at least a month or longer. As shown by the examples given hereinafter, gels have been prepared having a life span of at least 90 days, even when exposed to a temperature of 190° F. We have also found that formation solids such as sandstone and limestone promote gel stability.

Generally speaking, the pH of the final solution of the gelling reagents is preferably less than 7, more preferably in the order of 6. In general, pH is not controlling, but higher pH values retard gelation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels of the invention are defined for convenience, and not by way of limitation, in terms of the amount of cellulose ether contained therein, irrespective of whether or not all the cellulose ether is cross-linked. For example, a 1 weight percent or 10,000 ppm gel is a gel which was prepared from a starting cellulose ether solution which contained 1 weight percent or 10,000 ppm by weight of cellulose ether. The same system is employed for the gels prepared by the abovedescribed dilution technique.

The following examples will serve to further illustrate the invention.

EXAMPLE I

A series of runs was made to illustrate the formation of aqueous gels in accordance with the invention. For these runs a stock solution containing 1.5 pounds per barrel of high viscosity CMC-9 was prepared. To individual 233 ml portions of this stock solution there were added varying amounts of $Na_2S_2O_4$, dissolved in 27 ml of distilled water, with stirring for 10 seconds; and then varying amounts of $Na_2CR_2O_7.2H_2O$, dissolved in 20 ml of distilled water, with stirring for 10 minutes. Each test run solution thus had a total volume of 280 ml and the concentration of CMC therein was 1.25 pounds per barrel or 0.357 weight percent (3,570 ppm). Stable gels were formed in each instance. The results of these test runs are set forth below.

| $Na_2Cr_2O_7.2H_2O$ grams | $Na_2S_2O_4$ grams | Initial | Gel Strength 10 sec/10 min. (lbs/100 ft²) Aged 3 hours | Aged 3 days |
|---|---|---|---|---|
| 0.0 | 0.01 | 1/1 | — | 1/1 |
| 0.05 | 0.20 | 0/0 | 0/0 | 2/8 |
| 0.05 | 0.25 | 2/1 | 0/2 | 15/44 |
| 0.10 | 0.25 | 0/0 | 1/2 | 7/25 |
| 0.10 | 0.30 | 1/1 | 1/1 | 12/17 |
| 0.15 | 0.30 | 0/0 | 15/35 | 8/8 |
| 0.20 | 0.15 | 0/0 | 1/1 | 0/3 |

-continued

| $Na_2Cr_2O_7.2H_2O$ grams | $Na_2S_2O_4$ grams | Initial | Gel Strength 10 sec/10 min. (lbs/100 ft²) Aged 3 hours | Aged 3 days |
|---|---|---|---|---|
| 0.20 | 0.25 | 2/1 | 2/1 | 6/19 |
| 0.20 | 0.30 | 10/63 | 23/39 | 7/7 |

The above data indicate that with increasing amounts of $Na_2Cr_2O_7.2H_2O$, with sufficient reducing agent present to reduce $Cr^{+6}$ to $Cr^{+3}$, the rate of gelation increases. The data also indicate that for a given amount of $Na_2Cr_2O_7.2H_2O$, as the amount of reducing agent present increases, the rate of gelation increases.

EXAMPLE II

One liter of CMC-9 solution was prepared by mixing 3 grams of CMC-9 into 1 liter of synthetic oil field brine (total dissolved solids 14,091 ppm) on a magnetic bar stir mixer to form a 3,000 ppm solution of CMC-9. The CMC-9 solution was gelled by adding thereto 1.5 grams per liter of $Na_2S_2O_4$, with hand stirring and 1.5 grams per liter of $Na_2Cr_2O_7.2H_2O$ followed by stirring at room temperature. The solution was allowed to stand overnight and become gelled into a semisolid state. The gel was then placed in a glass container inside a steel pressure-tight bomb, and the bomb was placed in an oven set at a constant temperature of 190° F. No attempt was made to remove or exclude atmospheric oxygen in handling and preparing the gelled solution of CMC-9.

Seven days and again in nineteen days after the sample was placed in the oven, the bomb was opened and the gel visually inspected. On both occasions the gelled solution was still in a soft semirigid state resembling Jello. Sixty days after the sample of gel was placed in the oven, it was visually inspected again. There was a trace of free water but most of the solution was still in a semisolid state indicating the gelled solution of CMC-9 was very stable thermally. The gelled sample was visually checked again after being heated for 91 days at 190° F. More than ninety percent of the water was still in a semisolid gelled state. Part of the free water observed on the last two inspections was due to condensation because each time the sample bomb was inspected, it was cooled to room temperature rapidly with tap water and then opened. Each opening or inspection period subjected the sample to severe thermal changes and exposed the sample to atmospheric conditions.

These data definitely indicate that gelled solutions of cellulose ethers, e.g., CMC, can be prepared which will have sufficient stability (gel life) to be used as a fracture plugging material in formations where the formation temperature is not greater than about 200° F.

EXAMPLE III

Aqueous gels were prepared from CMC-9, and a linear polyacrylamide (PF-1160) to determine the effectiveness of the gels to hold oil-wet sand in suspension. Each said gel was prepared by adding to one liter volumes of simulated Dakota brine (approx. 14,000 ppm by weight total dissolved solids) the below-indicated amounts of polymer, with stirring, and then adding to the resulting solutions the indicated amounts of gelling agents, with stirring.

|    |                                       |           |
|----|---------------------------------------|-----------|
| 1. | CMC-9                                 | 3 grams   |
|    | $Na_2Cr_2O_7.2H_2O$                   | 0.75 gram |
|    | $Na_2S_2O_4$                          | 0.75 gram |
| 2. | PF-1160                               | 2 grams   |
|    | $Na_2Cr_2O_7.2H_2O$                   | 0.75 gram |
|    | $Na_2S_2O_4$                          | 0.75 gram |

Each of the gels was thick and viscous. Due to its greater molecular weight, only two grams of the polyacrylamide were required to produce a gel having a viscosity approximately the same as the gel prepared from CMC. To a 200 ml portion of each gel there was added 50 grams of Dakota sand taken from a well located in Converse County, Wyoming. This sand had been crushed to grain size and was covered with a heavy coating of reservoir crude oil. After the sand had been stirred into each gel, the gels were each placed in a sealed bomb and stored in an oven at 190° F.

After 7 days the bombs were removed from the oven and cooled to room temperature prior to opening. Visual inspection showed the sand had remained suspended in the gel prepared from CMC, but had settled to the bottom of the glass vessel containing the gel prepared from the polyacrylamide. These results indicate that the gel prepared from CMC was superior in the property of wetting and adhering to the oil-covered sand. These results also indicate the gel prepared from CMC would be superior to the gel prepared from polyacrylamide in adhering to the oil-wet faces of a fracture and remaining in place in said fracture.

EXAMPLE IV

A series of test runs was made to check the gelling properties of water-soluble cellulose ethers other than CMC. In each test run a 1.0 weight percent (10,000 ppm) solution in distilled water of the cellulose ether to be tested was prepared. To 250 ml of each such solution there was then added 0.375 gram of $Na_2S_2O_4$ and 0.375 gram of $Na_2Cr_2O_7.2H_2O$ (each in solutions containing 1.5 grams per liter), in that order, with stirring after each addition. The solutions were then examined visually for gel formation. Results of the tests were as follows:

| Cellulose Ether              | Result                  |
|------------------------------|-------------------------|
| Methyl Cellulose             | positive - gel formation |
| Hydroxypropyl cellulose      | "                       |
| Hydroxyethyl cellulose       | "                       |
| Carboxymethyl hydroxyethyl cellulose | "               |

Results of other gelling tests have shown that CMC-7 and CMC-12, as well as CMC-9, form good stable gels.

EXAMPLE V

A series of test runs was made to check the effectiveness of various reducing agents for reducing hexavalent chromium to trivalent chromium. In each test run a test tube was half-filled with a 1.0 weight percent (10,000 ppm) $Na_2Cr_2O_7.2H_2O$ solution. To this solution there was added a small amount of reducing agent. If the solution changed from orange color ($Cr^{+6}$) to green color ($Cr^{+3}$) within 30 minutes, the material was considered an effective reducing agent. Effective sulfur-containing reducing agents included: sodium sulfide, sodium hydrosulfite, sodium metabisulfite, potassium sulfite, sodium bisulfite, potassium metabisulfite, sodium sulfite, sodium thiosulfate (with small amount of heat), and thioacetamide + sulfuric acid. Effective nonsulfur-containing reducing agents included: hydroquinone, sodium nitrite, p-hydrazinobenzoic acid, hydrazine phosphite, and hydrazine dihydrochloride.

EXAMPLE VI

A selected few of the effective reducing agents from Example V were used with $Na_2Cr_2O_7.2H_2O$ to gel CMC solutions in a series of test runs. In each test run 1.6 grams of high viscosity CMC-9 was added to 280 ml of distilled water to give a solution containing 0.57 weight percent or 5,700 ppm of CMC. To each such solution there was then added 0.5 gram of the reducing agent and 0.5 gram of $Na_2Cr_2O_7.5H_2O$, in 10 weight percent solutions, in that order, with stirring. The solutions were then examined visually for gel formation. Results of the tests were as follows:

| Reducing Agent                | Results                  |
|-------------------------------|--------------------------|
| Thioacetamide + sulfuric acid | positive - gel formation |
| Sodium bisulfite              | "                        |
| Hydrazine phosphite           | "                        |

Results of other similar tests gave positive results, i.e., gel formation when hydroquinone was used as a reducing agent for $Na_2Cr_2O_7.2H_2O$.

EXAMPLE VII

Two sample solutions containing 0.357 weight percent (3,570 ppm) of high viscosity CMC-9 in distilled water were prepared. Sample No. 1 was prepared using 0.32 gram of $Na_2S_2O_4$ and 0.32 gram of $Na_2Cr_2O_7.2H_2O$, each in solution in distilled water. The total volume of the thus-prepared sample solution was 280ml. Sample No. 2 was prepared using 0.68 gram of $CrCl_3$ in solution in distilled water. The total volume of the thus-prepared sample solution was 280 ml. The gel resulting from Sample No. 1, using $Cr^{+6}$, was still a stable gel after 7 days. The gel resulting from Sample No. 2, using $Cr^{+3}$, was unstable and underwent syneresis within 10 minutes after mixing.

EXAMPLE VIII

Potassium permanganate and sodium permanganate were each used, along with sodium hydrosulfite, to gel a solution containing 0.357 weight percent (3,570 ppm) of high viscosity CMC-9 in brine containing 1200 ppm dissolved solids. To one 250 ml sample of said CMC solution there was added 0.375 gram of $KMnO_4$ (3.75 ml of 10 weight percent solution in distilled water), and 0.375 gram of $Na_2S_2O_4$ (3.75 ml of 10 weight percent solution), with stirring after each addition. The resulting gel had properties similar to gels prepared from like CMC solutions using substantially equivalent amounts of $Na_2Cr_2O_7.2H_2O$ and $Na_2S_2O_4$. Another gel was prepared in the same manner using $NaMnO_4$. The resulting gel had properties similar to the gel prepared using $KMnO_4$.

As indicated above, finely divided solids can be incorporated into the gels used in the practice of the invention as filler agents to increase the gel strength of said gels, e.g., increase the rigidity, firmness, and/or resistance to flow of said gels. Any suitable finely divided solid material capable of causing said increase in gel strength can be used in the practice of the invention. However, as shown by the examples given hereinafter, diatomaceous earth is a presently preferred finely divided material. Any technical grade of diatomaceous earth can be used in the practice of the invention. However, the "Celite" brand of diatomaceous earth is presently preferred, with the "Filter-Cel" grade of "Celite" being presently most preferred. Preferably, said diatomaceous earth will be rather coarsely ground, the grinding being coarse enough to preserve substantially at least a major portion of the structure of the diatom siliceous skeletons.

The amount of said finely divided solids materials used in the practice of the invention will depend upon the material used, and the properties of the gel per se wherein said solids are used, and can be any suitable amount which is sufficient to cause said increase in gel strength. However, for economic reasons, it will seldom be desirable to use more than up to about 2 pounds of finely divided solids per gallon of finished gel because the incremental benefits obtained when using more than about 1 to 1.5 pounds per gallon of gel are usually small. When said filler agents are used, it will usually be desirable to use at least about 0.05, preferably at least about 0.1, more preferably at least about 0.3, pound of finely divided solids per gallon of gel. Thus, generally speaking, and as a guide to those skilled in the art, amounts of finely divided solids in the range of from 0.05 to 2, preferably about 0.1 to about 1.5, more preferably from about 0.3 to about 1, pounds per gallon of gel will usually be used in the practice of the invention. It is usually convenient to base said amounts on the volume of water used in preparing the gel.

Aqueous gels used in the practice of the invention and having finely divided solids incorporated therein can be prepared in any suitable manner. For example, the above-described methods for preparing gels which do not have finely divided solids incorporated therein can be used. When it is desired to prepare the gel, e.g., on the surface, and then pump same into place into a subterranean formation, it is preferred to disperse the finely divided solid material into the polymer solution prior to the addition of the reducing agent and oxidizing agent thereto. When the gel is being prepared in a conduit while the components thereof are being pumped into a well for introduction into a subterranean formation, the finely divided solid material can be added, either as an aqueous slurry, or in the dry state by means of a mixing hopper, as the base solution containing the cellulose ether and other components are being pumped through said conduit. It will usually be preferred to add the finely divided solid material last.

Said finely divided solids used in the practice of the invention can have a wide range of particle sizes which can vary from material to material, depending upon the nature of the particular material, the properties desired in the final gel, and what is commercially available. Any particle size material can be used which will give the improved results of the invention. Generally speaking, but not necessarily by way of limitation on the invention, said finely divided solids can have particle sizes within the range of from 0.015 to 420 microns. For particular types of said finely divided solids, preferred ranges of particle sizes, in some instances, are as follows: kaolin, from 0.25 to 20 microns; Illite clay, from 0.1 to 2 microns; ground nutshells, such as walnut hulls, from 1 to 420 microns; silica flour, from 0.015 to 110 microns; Microethene particles, from 3 to 30 microns; and diatomaceous earth, from 4 to 20 microns.

EXAMPLE IX

A series of runs was made to illustrate the formation of aqueous gels using various reducing agents and oxidizing agents in various amounts, and the effect of having finely divided solids incorporated therein, in accordance with the invention. For these runs a stock solution containing 10,000 ppm by weight of high viscosity CMC-9 was prepared using a synthetic brine having a total dissolved solids content of about 4,000 ppm by weight, broken down as follows: NaCl, about 1,020 ppm; $Na_2SO_4$, about 1,630 ppm; $NaHCO_3$, about 195 ppm; $MgCl_2.6H_2O$, about 385 ppm; and $CaCl_2$, about 770 ppm.

A series of different reducing agents was used in varying amounts in different groups of runs as set forth in Table I below. A stock solution of each reducing agent was prepared in a 10 weight percent solution in deionized water, and the indicated amounts thereof added to portions of the stock CMC solution using a measuring syringe. In some runs mixtures of reducing agents were used. Similarly, a 10 weight percent stock solution of each oxidizing agent was prepared in deionized water and the indicated amounts thereof added to portions of stock CMC solution using a measuring syringe. In some runs mixtures of reducing agents were used.

In general, the gel of each run was prepared by placing 375 ml of the stock CMC solution in a malt mixer cup and adding the reducing agent and oxidizing agent thereto in the amounts specified in Table I below. In some runs the 10,000 ppm CMC solution was diluted to 7,500 ppm using the above-described brine. After thorough mixing for up to about one minute, about 200 ml of the gel was poured into a 250 ml beaker for the penetrometer test, described below. About 65 ml of the gel was aspirated into a shearometer cylinder for the extruding shearometer test, described below. After said beakers and cylinders were filled, the gels therein were aged at room temperature for the times indicated to permit development of gel strength prior to running said penetrometer and shearometer tests. During aging the beakers and cylinders were covered with wax paper to minimize fluid loss by evaporation.

Finely divided solids were incorporated into the gels of Runs 12–29, inclusive. In these runs the finely divided solid material was added to the polymer solution and thoroughly dispersed therein prior to adding the reducing agent and the oxidizing agent. Runs 16–20 were aged at 190° F. for 63 hours to illustrate the stability of the gels at elevated temperatures such as can be encountered in some subterranean formations. This aging was carried out by placing individual beakers and extrusion cylinders into individual bombs, sealing same, and placing the bombs in an oven. After heating as specified, the bombs were cooled in running water to about 85° F., opened, and the penetrometer and shearometer tests run.

The above-mentioned penetrometer test comprises a modification of ASTM Standard D 217-68 for "Cone Penetration of Lubricating Grease." For the tests carried out herein, the standard penetrometer was modified by removing the standard nose cone and replacing same with a small bullet-shaped cone having a diameter of 0.34 inch at its base and a spherical radius at the nose of 0.158 inch. The weight of the cone and the shaft was 58.5 grams. In general, the procedure followed was that described in said D-217-68 for "Procedure for Undisturbed Penetration." The tests were carried out at room temperature, about 75° F. In running a test the beaker containing the sample is placed under the bullet cone with the nose of the cone touching the surface of the gel. The cone and shaft are then released and the cone penetrates the gel. Penetration depth is measured in tenths of a millimeter in standard manner on the circular scale attached to the instrument. Five readings were taken on each gel and the average of said readings is set forth in Table I below.

The above-mentioned extruding shearometer test comprises extruding a sample of the gel from a cylinder provided with a 10-mesh Tyler screen having a cross-sectional area of 1.03 square inches across the exit thereof. Said screen is equivalent to a No. 12 U.S. standard series screen which has openings of 0.0661 inch. The apparatus employed comprises a metal cylinder having an inside diameter of 1.375 inches and a length of 5.25 inches, and having a screw flange on each end. Said cylinder has a volume of about 65 ml. The shearometer is employed in a vertical position with the top flange accommodating connections for driving a piston (having an O ring seal thereon) throughout the length of 5.25 inches. The connections at the top of the cylinder are manifolded to provide for application of a vacuum or a positive pressure for operating the piston. Said 10-mesh Tyler screen is disposed in the bottom screw flange of the cylinder.

Samples of gel are prepared for shearometer tests as follows. A cylindrical glass tube having a length of about 3½ inches is employed. The inside diameter of this tube is 33 millimeters, substantially the same as the diameter of shearometer metal cylinder. The glass tube is placed on a table with a paper under one end. A small amount of paraffin is poured into the glass tube to form a lower seal with the paper. Freshly mixed gel materials (solutions of polymer, reducing agent, and oxidizing agent) are then poured into the top of the glass cylinder until it is nearly filled. This procedure casts a cylinder of gel for use in the shearometer. The gels are then aged for the desired period, usually from 0.5 to 3 days, at room or elevated temperatures to permit development of gel strength. After aging, the cylinder of gel is removed from the glass cylinder by inverting the cylinder, and the cast gel is then ready for insertion into the metal cylinder of the shearometer. The piston in the shearometer is lowered to its bottom position and the lower flange removed. The cylinder of cast gel is then positioned at the bottom of the cylinder and vacuum applied to the top of the piston which pulls the cylinder of cast gel into the metal cylinder of the shearometer. The lower flange of the shearometer containing the 10-mesh Tyler screen is then placed on the metal cylinder. The apparatus is now ready for operation.

A 10 psi air pressure is applied to the top of the piston causing it to push downward on the gel to extrude gel through the Tyler screen. For viscous gels having higher gel strengths, only a small amount of gel, if any, is extruded and collected in a beaker over a measured period of time during which pressure is applied. For less viscous gels having lower gel strengths, a larger amount of gel will be extruded through the Tyler screen and collected in the beaker during the measured period of time. The amount of extruded gel collected is weighed and the weight thereof is divided by the measured time, in minutes, to give the extrusion rate in grams per minute as a measure of the gel strength, e.g., toughness of the gel or shear resistance of the gel. For less viscous gels the apparatus may be operated to extrude the gel for only 10 seconds, for example, and for tough gels, the apparatus may be operated to extrude the gels for a period of 30 seconds, for example, but the data are converted to grams per minute. Results of the tests run in this manner are set forth in Table I below.

TABLE I

| Run No. | Polymer Conc., ppm | Reducing Agent & Conc., ppm | Oxidizing Agent & Conc., ppm | Type & Weight of Solids in Gel, lbs. per gallon | Average Penetrometer Rdg & Age of Gel, mm & hours (mm) | | Average Ext. Shearometer Rdg & Age of Gel, grams/min. and hours (g/min.) | (hr) |
|---|---|---|---|---|---|---|---|---|
| | | | | | | (hr) | | |
| 1 | 10,000 | $NaHSO_3$ 800 | $Na_2Cr_2O_7.2H_2O$ 1,000 | None | 12.4 | 22 | 5.4 | 22 |
| 2 | 10,000 | $NaHSO_3$ 1,000 | $Na_2Cr_2O_7.2H_2O$ 1,250 | None | 8.8 | 22 | 5.4 | 22 |
| 3 | 10,000 | $NaHSO_3$ 1,200 | $Na_2Cr_2O_7.2H_2O$ 1,500 | None | 8.1 | 22 | 7.9 | 22 |
| 4 | 10,000 | $NaHSO_3$ 1,400 | $Na_2Cr_2O_7.2H_2O$ 1,750 | None | 6.4 | 22 | 17.1 | 22 |
| 5 | 10,000 | $Na_2S_2O_4$ 1,250 | $Na_2Cr_2O_7.2H_2O$ 1,000 | None | 23.4 | 18 | 5.5 | 18 |
| 6 | 10,000 | $Na_2S_2O_3.5H_2O$ 2,000 | $Na_2Cr_2O_7.2H_2O$ 1,000 | None | 22.5 | 19 | 10.7 | 19 |
| 7 | 10,000 | $Na_2S_2O_3.5H_2O$ 4,000 | $Na_2Cr_2O_7.2H_2O$ 1,000 | None | 20.5 | 19 | 8.3 | 19 |
| 8 | 10,000 | $Na_2S_2O_3.5H_2O$ 6,000 | $Na_2Cr_2O_7.2H_2O$ 1,000 | None | 18.7 | 19 | 8.0 | 19 |
| 9 | 10,000 | $Na_2S_2O_3.5H_2O$ 6,250 | $Na_2Cr_2O_7.2H_2O$ 1,250 | None | 17.1 | 18 | 5.4 | 18 |
| 10 | 10,000 | $Na_2S_2O_3.5H_2O$ 5,000 + 250 of $NaHSO_3$ | $Na_2Cr_2O_7.2H_2O$ 1,250 | None | 13.6 | 18 | 5.6 | 18 |
| 11 | 10,000 | $Na_2S_2O_3.5H_2O$ 5,000 + 500 of $NaHSO_3$ | $Na_2Cr_2O_3.2H_2O$ 1,250 | None | 11.9 | 18 | 8.5 | 18 |
| 12 | 7,500 | $NaHSO_3$ 800 | $Na_2Cr_2O_7.2H_2O$ 1,000 | DE[b] 1.0 | 8.8 | 22 | Would not Extrude | |
| 13[c] | 7,500 | $NaHSO_3$ 800 | $Na_2Cr_2O_7.2H_2O$ 1,000 | DE 1.25 | 7.4 | 22 | Would not Extrude | |
| 14 | 7,500 | $NaHSO_3$ 800 | $Na_2Cr_2O_7.2H_2O$ 1,000 | DE 1.50 | 7.0 | 22 | Would not Extrude | |
| 15[c] | 10,000 | $NaHSO_3$ 1,000 | $Na_2Cr_2O_7.2H_2O$ 1,250 | DE 1.0 | 6.3 | 18 | Would not Extrude | |

TABLE I-continued

| Run No. | Polymer Conc., ppm | Reducing Agent & Conc., ppm | Oxidizing Agent & Conc., ppm | Type & Weight of Solids in Gel, lbs. per gallon | | Average Penetrometer Rdg & Age of Gel, mm & hours | | Average Ext. Shearometer Rdg & Age of Gel, grams/min. and hours | |
|---|---|---|---|---|---|---|---|---|---|
| | | | | | | (mm) | (hr) | (g/min.) | (hr) |
| (Gels Heated at 190°F for 63 Hours and then Cooled to 85°F) | | | | | | | | | |
| 16 | 10,000 | NaHSO$_3$ 1,000 | Na$_2$Cr$_2$O$_7$.2H$_2$O 1,250 | Walnut Hulls | 1.0 | 16.3 | 16.3 | Not tested | |
| 17 | 10,000 | NaHSO$_3$ 1,000 | Na$_2$Cr$_2$O$_7$.2H$_2$O 1,250 | DE | 1.0 | 9.4 | 63 | Not tested | |
| 18 | 10,000 | NaHSO$_3$ 1,000 | Na$_2$Cr$_2$O$_7$.2H$_2$O 1,250 | Illite Clay | 1.0 | 36.2 | 63 | Not tested | |
| 19 | 10,000 | NaHSO$_3$ 1,000 | Na$_2$Cr$_2$O$_7$.2H$_2$O 1,250 | Kaolin | 1.0 | 18.1 | 63 | Not tested | |
| 20 | 10,000 | NaHSO$_3$ 1,000 | Na$_2$Cr$_2$O$_7$.2H$_2$O 1,250 | Silica Flour | 1.0 | 19.9 | 63 | 41.0 | 18 |
| 21[a] | 10,000 | NaHSO$_3$ 1,000 | K$_2$CrO$_4$ 1,640 | DE | 1.0 | 16.4 | 18 | 2.3 | 66 |
| 22 | 10,000 | NaHSO$_3$ 500 | Na$_2$Cr$_2$O$_7$.2H$_2$O 600 | DE | 0.3 | 15.0 | 22 | 2.0 | 22 |
| 23 | 10,000 | NaHSO$_3$ 1,000 | Na$_2$Cr$_2$O$_7$.2H$_2$O 1,200 | DE | 0.1 | 8.6 | 18 | 120 | 18 |
| 24 | 10,000 | NaHSO$_3$ 1,000 | Na$_2$Cr$_2$O$_7$.2H$_2$O 1,200 | DE | 0.3 | 6.2 | 18 | Would not Extrude | |
| 25 | 10,000 | NaHSO$_3$ 1,000 | Na$_2$Cr$_2$O$_7$.2H$_2$O 1,200 | DE | 0.5 | 6.1 | 18 | Would not Extrude | |
| 26 | 10,000 | NaHSO$_3$ 1,000 | Na$_2$Cr$_2$O$_7$.2H$_2$O 1,200 | DE | 0.7 | 6.1 | 18 | Would not Extrude | |
| 27 | 10,000 | NaHSO$_3$ 800 | Na$_2$CrO$_4$ [a] Na$_2$Cr$_2$O$_7$.2H$_2$O 1,000 (50/50 Mix) | DE | 1.0 | 6.7 | 18 | Would not Extrude | |
| 28 | 10,000 | NaHSO$_3$ 800 | 25% Na$_2$Cr$_2$O$_7$.2H$_2$O[a] + 75% Na$_2$CrO$_4$ 1,000 | DE | 1.0 | 6.7 | 18 | Would not Extrude | |
| 29 | 1,000 | NaHSO$_3$ 800 | 75% Na$_2$Cr$_2$O$_7$.2H$_2$O[a] 25% Na$_2$CrO$_4$ 1,000 | DE | 1.0 | 5.3 | 18 | Would not Extrude | |

[a]Oxidizing agents were mixed so final concentration was on an equivalent sodium dichromate dihydrate basis.
[b]Diatomaceous earth.
[c]Gels 13 and 15 were subsequently aged two weeks at 190°F and remained rigid and stable.
[d]Gel 21 required 68 minutes to obtain an apparent viscosity of 900 cp while gel 15 obtained 900 cp viscosity in 2 minutes.

Referring to the above Table I, it will be noted that diatomaceous earth (DE) was outstanding in increasing the gel strength, e.g., the rigidity, firmness, and/or resistance to flow of the gels. Note particularly Runs 12–15 wherein none of the gels could be extruded from the extrusion shearometer. Comparing Runs 2 and 15, wherein the components of the gels were the same except for the presence of DE in the gel of Run 15, clearly shows the effect of the DE in increasing the gel strength, e.g., the rigidity, firmness, and/or resistance to flow or shear. The gel of Run 15 was clearly superior in this respect, even though it was aged four hours less than the gel of Run 2. The reason for the superiority of diatomaceous earth as compared to the other finely divided filler materials is not presently understood completely. It is presently believed said superiority may be due, at least in part, to the more porous nature of the DE particles.

The data in Table I also illustrate how the properties of the gels can be tailored by varying the proportions and types of gelling agents used. For example, comparing Runs 1–4 with Runs 6–9 indicates that NaHSO$_3$ is superior to Na$_2$S$_2$O$_3$.5H$_2$O as a reducing agent. This superiority is further indicated by Runs 10 and 11 wherein a relatively small amount of NaHSO$_3$ was used with a relatively large amount of Na$_2$S$_2$O$_3$.5H$_2$O. Run 21, when compared with Run 15, indicates that K$_2$CrO$_4$ is a less desirable oxidizing agent than Na$_2$Cr$_2$O$_7$.2H$_2$O, probably due to a slower rate of gelation. Run 22 illustrates the effect of using smaller quantities of gelling agents, when compared with Run 24.

Runs 16–20 illustrate the stability of the gels of the invention at elevated temperatures such as can be encountered in subterranean formations.

EXAMPLE X

A second series of runs was made to further illustrate the effect of incorporating finely divided solids into aqueous gels in accordance with the invention. In these runs the test gels were prepared in the same manner as described in Example IX above except that in each run sufficient gel was prepared for three tests: (a) the above-described penetrometer test; (b) the above-described extruding shearometer test; and (c) a twisting or torque shearometer test. In Runs 30, 31, and 35–45, inclusive, CMC-9 was used as the base polymer. In Runs 32, 33, and 34 a substantially linear polyacrylamide, PF-1120, having a degree of hydrolysis of about 25 percent and a nitrogen content of about 9.2 percent was used as the base polymer.

The apparatus employed in making said twisting shearometer test comprises a modification of a standard Model 35 Fann V-G meter, manufactured by Geophysical Machine Works, Houston, Texas. In modifying said Fann V-G meter, the conventional viscosity measuring cup, sleeve, and bob were removed. An adapter shaft was then removably attached at its upper end to the lower end of the regular torque shaft to which said viscosity measuring bob is normally attached. The upper end of said torque shaft is not altered and is connected in its normal manner to the torque measuring components of the Fann V-G meter. A cylindrical shear bob having a diameter of ½ inch, a length of 1½ inches, and having a spindle shaft extending therethrough was provided. The surface of said shear bob is roughened, knurled, or etched for purposes described hereinafter. Said spindle shaft was adapted at its upper end to be removably attached to the lower end of said adapter shaft. The lower end of said spindle shaft extends through said shear bob for a purpose described hereinafter. A vertically adjustable sample holder comprising a platform mounted on the shaft of a motor having a speed of rotation of 1 rpm was positioned below said regular torque shaft.

In preparing for a test, the roughened surface of the shear bob is covered with a thin absorbent paper fixed to said surface with a thin coat of rubber cement. A steel spacer element having a hole in the center thereof is placed in the bottom of a 100 ml beaker. Next, approximately 85 to 90 ml of the newly mixed gel to be tested, and which was prepared as described above, is placed in said beaker. The paper-covered shear bob is then placed in the gel in the beaker with the lower end of said spindle shaft in the hole in said steel spacer. A plastic spacer element having a hole in the center thereof is then placed over the upper end of said spindle shaft and floats on the surface of said gel. The purpose of said spacer elements is to insure that the shear bob is maintained centered in the gel while the gel is forming and aging. The gel strength can then be measured as described below. However, in most instances, it is preferred to allow the gel to age for a specified period to develop gel strength. Any suitable aging period, depending upon the concentration and other properties of the gel, can be used. Usually, periods up to about 24 hours are sufficient. During said aging period, the paper on the surface of the shear bob absorbs the gelling solution as gelation occurs, with consequent formation of gel within the pores of the paper, and thus provides a firm bond between the gel and the shear bob.

After aging, the beaker containing the gel and the shear bob positioned therein is firmly mounted on the rotatable platform by means of a piece of carpet tape having adhesive on both sides thereof. The upper spacer element is removed and the upper end of the shear bob spindle shaft is connected to the lower end of the adapter shaft which is then connected at its upper end to the lower end of the Fann meter torque shaft. The motor which normally drives said sleeve, as in viscosity measurements, is not used in these tests. The one rpm motor driving the sample platform is then started and the torsion dial in the top of the Fann V-G meter is observed. As the beaker is rotated, there is an increase in the readings of said dial. The rotation of said beaker is a function of time. For example, after ½ minute the beaker will have rotated 180 degrees. The shear bob in the gel resists this rotation due to the gel strength of the gel. The dial in the top of the Fann meter measures this resistance in degrees of tension applied against the calibrated spring in the Fann meter torque measuring mechanism. When the gel strength of the gel is exceeded and the gel ruptures, said dial reading immediately decreases. The maximum reading at this point is recorded and employed in the following formula to calculate the gel strength:

$$G_s = 100 \, K_s \theta / r_b A_b$$

where
$G_s$ is the gel strength, in lbs./100 ft$^2$
$K_s$ is torsional spring constant, in ft. lbs./degree (converted from Dyne cm/degree as furnished by spring manufacturer)
$\theta$ is a dial reading, in degrees
$r_b$ is the radius of the shear bob, in feet
$A_b$ is the area of the shear bob, in feet$^2$ Since the curved surface of the cylindrical shear bob is covered with an absorbent paper, the area of the ends of the shear bob is ignored in making calculations. A range of springs having different constants (stiffness) is available commercially for the Fann V-G meter. By employing springs having different degrees of stiffness, one can measure gel strengths over a range of from about 5 to 20,000 lbs./100 ft$^2$. On the modified Fann Viscometer it is easy to position an individual gel sample in the instrument and a measurement requires only one to two minutes to complete.

The results of penetrometer tests, extrusion shearometer tests, and twisting shearometer tests on the gels of said second series of runs are set forth in Table II below.

TABLE II

| Run No. | Polymer Conc., ppm | Reducing Agent & Conc., ppm | Oxidizing Agent & Conc., ppm | Type & Weight of Solids in Gel, lbs. per gallon | | Average Penetrometer Rdg & Age of Gel, mm & hours (mm) | (hr) | Average Ext. Shearometer Rdg & Age of Gel, grams/min. and hours (g/min.) | (hr) | Twisting Shearometer Gel Strength lbs./100 sq. ft. |
|---|---|---|---|---|---|---|---|---|---|---|
| 30 | 10,000 | NaHSO$_3$ 1,000 | Na$_2$Cr$_2$O$_7$.2H$_2$O 1,250 | DE$^{(a)}$ | 2.0 | 3.8 | 24 | Would not Extrude | | >20,000 |
| 31 | 10,000 | NaHSO$_3$ 1,000 | Na$_2$Cr$_2$O$_7$.2H$_2$O 1,250 | DE | 0.1 | 8.1 | 24 | 168.0 | 24 | >20,000 |
| 32 | 10,000 PF-1120$^{(b)}$ | NaHSO$_3$ 1,000 | Na$_2$Cr$_2$O$_7$.2H$_2$O 1,250 | DE | 1.0 | >40.0 | 24 | 0.3 | 24 | 10,000 |
| 33 | 10,000 PF-1120 | NaHSO$_3$ 1,000 | Na$_2$Cr$_2$O$_7$.2H$_2$O 1,250 | DE | 0.5 | 22 40.0 | 24 | 3.5 | 25 | 3,335 |
| 34 | 10,000 PF-1120 | NaHSO$_3$ 1,000 | Na$_2$Cr$_2$O$_7$.2H$_2$O 1,250 | None | | >40.0 | 24 | 67.7 | 24 | Not tested |
| 35 | 10,000 | NaHSO$_3$ 1,000 | Na$_2$Cr$_2$O$_7$.2H$_2$O 1,250 | Microethene$^{(c)}$ | 1.0 | 11.2 | 24 | 280.0 | 24 | >20,000 |
| 36 | 10,000 | NaHSO$_3$ 1,000 | Na$_2$Cr$_2$O$_7$.2H$_2$O 1,250 | Illite Clay | 1.0 | >40.0 | 24 | >300 | 24 | 4,269 |
| 37 | 10,000 | NaHSO$_3$ 1,000 | Na$_2$Cr$_2$O$_7$.2H$_2$O 1,250 | Kaolin | 1.0 | 7.1 | 24 | 26.4 | 24 | >20,000 |
| 38 | 10,000 | NaHSO$_3$ 1,000 | Na$_2$Cr$_2$O$_7$.2H$_2$O 1,250 | Silica flour | 1.0 | 8.3 | 24 | 263.3 | 24 | >20,000 |
| 39 | 10,000 | NaHSO$_3$ 1,000 | Na$_2$Cr$_2$O$_7$.2H$_2$O 1,250 | DE | 1.0 | 5.1 | 24 | Would not Extrude | | >20,000 |
| 40 | 7,500 | NaHSO$_3$ 800 | Na$_2$Cr$_2$O$_7$.2H$_2$O 1,000 | DE | 0.1 | 9.5 | 24 | 368.5$^{(d)}$ | 24 | 5,870 |
| 41 | 7,500 | NaHSO$_3$ | Na$_2$Cr$_2$O$_7$.2H$_2$O | DE· | 0.3 | 8.4 | 24 | 487.0 | 24 | >20,000 |

TABLE II-continued

| Run No. | Polymer Conc., ppm | Reducing Agent & Conc., ppm | Oxidizing Agent & Conc., ppm | Type & Weight of Solids in Gel, lbs. per gallon | | Average Penetrometer Rdg & Age of Gel, mm & hours (mm) | (hr) | Average Ext. Shearometer Rdg & Age of Gel, grams/min. and hours (g/min.) | (hr) | Twisting Shearometer Gel Strength lbs./100 sq. ft. |
|---|---|---|---|---|---|---|---|---|---|---|
| 42 | 7,500 | 800 NaHSO$_3$ | 1,000 Na$_2$Cr$_2$O$_7$.2H$_2$O | DE | 0.5 | 9.2$^{(c)}$ | 24 | 2.8 to | 24 | >20,000 |
| 43 | 7,500 | 800 NaHSO$_3$ | 1,000 Na$_2$Cr$_2$O$_7$.2H$_2$O | DE | 0.7 | 6.8 | 24 | Would not Extrude | | >20,000 |
| 44 | 7,500 | 800 NaHSO$_3$ | 1,000 Na$_2$Cr$_2$O$_7$.2H$_2$O | DE | 1.0 | 5.4 | 24 | Would not Extrude | 24 | >20,000 |
| 45 | 7,500 | 800 NaHSO$_3$ | 1,000 Na$_2$Cr$_2$O$_7$.2H$_2$O | DE | 1.5 | 4.5 | 24 | Would not Extrude | 24 | >20,000 |

$^{(a)}$Diatomaceous earth.
$^{(b)}$Polyacrylamide.
$^{(c)}$Gel appears softer than expected. Could be result of mistake with chemical concentrations.
$^{(d)}$Run at ΔP of 5.5 psi.
$^{(e)}$Polyethylene plastic particles.

In the above Table II, the base polymer used in Runs 32, 33, and 34 was substantially linear polyacrylamide. Said runs, when compared with other comparable runs, e.g., Run 39 in Table II and Run 25 in Table I, shows that the gels prepared from polyacrylamides are clearly inferior to the gels prepared from CMC.

Runs 40–45 and 30 illustrate the effect of using increasing quantities of DE in gels containing a lower concentration of polymer.

The runs in Table II illustrate the use of the twisting shearometer in measuring the quality of gels of the invention. It is believed said twisting shearometer provides a measure of the force necessary to cause an internal failure, so to speak, within the gel itself. It is believed that the data obtained from employing said twisting shearometer show that the gels containing the less effective filler agents have significant gel strengths, and thus do have utility in some applications, e.g., where low differential pressures are exerted on the gel in place. There are advantages in some instances in using gels containing filler agents where high gel strengths are not controlling, for example, in relatively small fractures in high permeability zones where it would be desirable to use low concentrations of filler agent to assist in controlling leak-off along the face of the fracture.

The diatomaceous earth used in the runs of Tables I and II was the Filter-Cel grade of Celite brand of diatomaceous earth.

Herein and in the claims, unless otherwise specified, the term "solution" is employed generically and includes colloidal solutions as well as true solutions.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. An aqueous gel, suitable for plugging fractures in subterranean formations, comprising water to which there has been added:
   a water-thickening amount of a water-soluble cellulose ether;
   a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state;
   a water-soluble reducing agent in an amount which is effective to reduce at least a portion of said metal to said lower valence state and cause said gelation with the formation of said gel, said reducing agent being selected from the group consisting of sodium sulfite, sodium hydrosulfite, potassium hydrosulfite, sodium metabisulfite, potassium sulfite, sodium bisulfite, potassium metabisulfite, sodium sulfide, hydrogen sulfide, sodium, potassium thiosulfate, thioacetamide, hydroquinone, p-hydrazinobenzoic acid, hydrazine phosphite, hydrazine dichloride, and mixtures thereof; and
   a finely divided solid capable of causing, and in an amount thereof sufficient to cause, an increase in the gel strength of said gel.

2. An aqueous gel according to claim 1 wherein the amount of said polyvalent metal compound is sufficient to supply at least about $3 \times 10^{-6}$ gram atoms of said polyvalent metal per gram of said cellulose ether.

3. An aqueous gel according to claim 1 wherein there has been added to said water:
   from 0.2 to 1.5 weight percent of said cellulose ether, based upon the weight of said water;
   from 0.05 to 60 weight percent of said polyvalent metal compound, based upon the weight of said cellulose ether;
   from 0.1 to at least about 200 percent of the stoichiometric amount of said reducing agent required to reduce said polyvalent metal to said lower polyvalent valence state; and
   at least about 0.05 pound of said finely divided solid per gallon of said water.

4. An aqueous gel according to claim 3 wherein:
   the amount of said polyvalent metal compound is within the range of from 0.5 to 30 weight percent; and
   the amount of said finely divided solid is within the range of from 0.1 to 1.5 pound per gallon of said water.

5. An aqueous gel according to claim 1 wherein:
   said cellulose ether comprises a carboxymethyl cellulose ether; and
   said polyvalent metal compound comprises a compound of chromium wherein the valence of the chromium is +6 and the valence of at least a portion of said chromium is reduced to +3.

6. An aqueous gel according to claim 5 wherein said finely divided solid comprises diatomaceous earth.

7. An aqueous gel according to claim 5 wherein:
said polyvalent metal compound is selected from the group consisting of ammonium chromate, ammonium dichromate, the alkali metal chromates and dichromates, chromium trioxide, and mixtures thereof; and
said reducing agent is selected from the group consisting of sodium or potassium sulfite, sodium or potassium hydrosulfite, sodium or potassium metabisulfite, sodium sulfide, hydrogen sulfide, sodium or potassium thiosulfate, and mixtures thereof.

8. An aqueous gel according to claim 7 wherein said finely divided solid is diatomaceous earth.

9. An aqueous gel according to claim 8 wherein:
said cellulose-ether is sodium carboxymethyl cellulose; and
said polyvalent metal compound is sodium dichromate or potassium dichromate.

10. An aqueous gel according to claim 9 wherein:
the amount of said cellulose ether is within the range of from 0.2 to 1.5 weight percent, based upon the weight of said water;
the amount of said polyvalent metal compound is within the range of from 0.5 to 30 weight percent, based upon the weight of said cellulose ether; and
the amount of said diatomaceous earth is within the range of from 0.1 to 1.5 pound per gallon of said water.

11. An aqueous gel according to claim 10 wherein:
the amount of said cellulose ether is within the range of from 0.3 to 1 weight percent; and
the amount of said diatomaceous earth is within the range of from 0.3 to 1 pound.

12. An aqueous gel according to claim 8 wherein:
the amount of said cellulose ether is within the range of from 0.2 to 1.5 weight percent, based upon the weight of said water;
the amount of said polyvalent metal compound is within the range of from 0.5 to 30 weight percent, based upon the weight of said cellulose ether; and
the amount of said diatomaceous earth is within the range of from 0.1 to 1.5 pound per gallon of said water.

13. A method for producing an aqueous gel having increased gel strength, and which is suitable for plugging fractures in subterranean formations, which method comprises:
thickening water by incorporating therein a thickening amount of a water-soluble cellulose ether;
incorporating in said water a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state;
incorporating in said water a water-soluble reducing agent in an amount which is effective to reduced at least a portion of said metal to said lower valence state and cause said gelation with the formation of said gel, said reducing agent being selected from the group consisting of sodium sulfite, sodium hydrosulfite, potassium hydrosulfite, sodium metabisulfite, potassium sulfite, sodium bisulfite, potassium metabisulfite, sodium sulfide, hydrogen sulfide, sodium thiosulfate, potassium thiosulfate, thioacetamide, hydroquinone, p-hydrazinobenzoic acid, hydrazine phosphite, hydrazine dichloride, and mixtures thereof; and
incorporating in said water a finely divided solid capable of causing, and in an amount thereof sufficient to cause, an increase in the gel strength of said gel.

14. A method according to claim 13 wherein there is incorporated in said water:
from 0.2 to 1.5 weight percent of said cellulose ether, based upon the weight of said water;
from 0.05 to 60 weight percent of said polyvalent metal compound, based upon the weight of said cellulose ether;
from 0.1 to at least about 200 percent of the stoichiometric amount of said reducing agent required to reduce said polyvalent metal to said lower polyvalent valence state; and
at least about 0.05 pound of said finely divided solid per gallon of said water.

15. A method according to claim 14 wherein:
the amount of said polyvalent metal compound is within the range of from 0.5 to 30 weight percent; and
the amount of said finely divided solid is within the range of from 0.1 to 1.5 pound per gallon of said water.

16. A method according to claim 13 wherein:
said cellulose ether comprises a carboxymethyl cellulose ether; and
said polyvalent metal compound comprises a compound of chromium wherein the valence of the chromium is +6 and the valence of at least a portion of said chromium is reduced to +3.

17. A method according to claim 16 wherein said finely divided solid comprises diatomaceous earth.

18. A method according to claim 16 wherein:
said polyvalent metal compound is selected from the group consisting of ammonium chromate, ammonium dichromate, the alkali metal chromates and dichromates, chromium trioxide, and mixtures thereof; and
said reducing agent is selected from the group consisting of sodium or potassium sulfite, sodium or potassium hydrosulfite, sodium or potassium metabisulfite, sodium sulfide, hydrogen sulfide, sodium or potassium thiosulfate, and mixtures thereof.

19. A method according to claim 18 wherein said finely divided solid is diatomaceous earth.

20. A method according to claim 19 wherein:
said cellulose ether is sodium carboxymethyl cellulose; and
said polyvalent metal compound is sodium dichromate or potassium dichromate.

21. A method according to claim 20 wherein:
the amount of said cellulose ether is within the range of from 0.2 to 1.5 weight percent, based upon the weight of said water;
the amount of said polyvalent metal compound is within the range of from 0.5 to 30 weight percent, based upon the weight of said cellulose ether; and
the amount of said diatomaceous earth is within the range of from 0.1 to 1.5 pound per gallon of said water.

22. A method according to claim 21 wherein:
the amount of said cellulose ether is within the range of from 0.3 to 1 weight percent; and the amount of said diatomaceous earth is within the range of from 0.3 to 1 pound.

23. A method according to claim 19 wherein:
the amount of said cellulose ether is within the range of from 0.2 to 1.5 weight percent, based upon the weight of said water;
the amount of said polyvalent metal compound is within the range of from 0.5 to 30 weight percent, based upon the weight of said cellulose ether; and
the amount of said diatomaceous earth is within the range of from 0.1 to 1.5 pound per gallon of said water.

* * * * *

UNITED STATES PATENT AND TRADEMARK OFFICE
CERTIFICATE OF CORRECTION

PATENT NO. : 3,955,998
DATED : May 11, 1976
INVENTOR(S) : Richard L. Clampitt and James E. Hessert It is certified that error appears in the above-identified patent and that said Letters Patent are hereby corrected as shown below:

Column 22, claim 1, line 31, after "sodium" the word --- thiosulfate --- should be inserted.

Signed and Sealed this

Third Day of May 1977

[SEAL]

Attest:

RUTH C. MASON
*Attesting Officer*

C. MARSHALL DANN
*Commissioner of Patents and Trademarks*